Sept. 20, 1932.    E. MUELLER    1,878,883
CORN PLANTER
Filed March 26, 1931    5 Sheets-Sheet 1

WITNESS

INVENTOR
Edward Mueller
BY
ATTORNEY

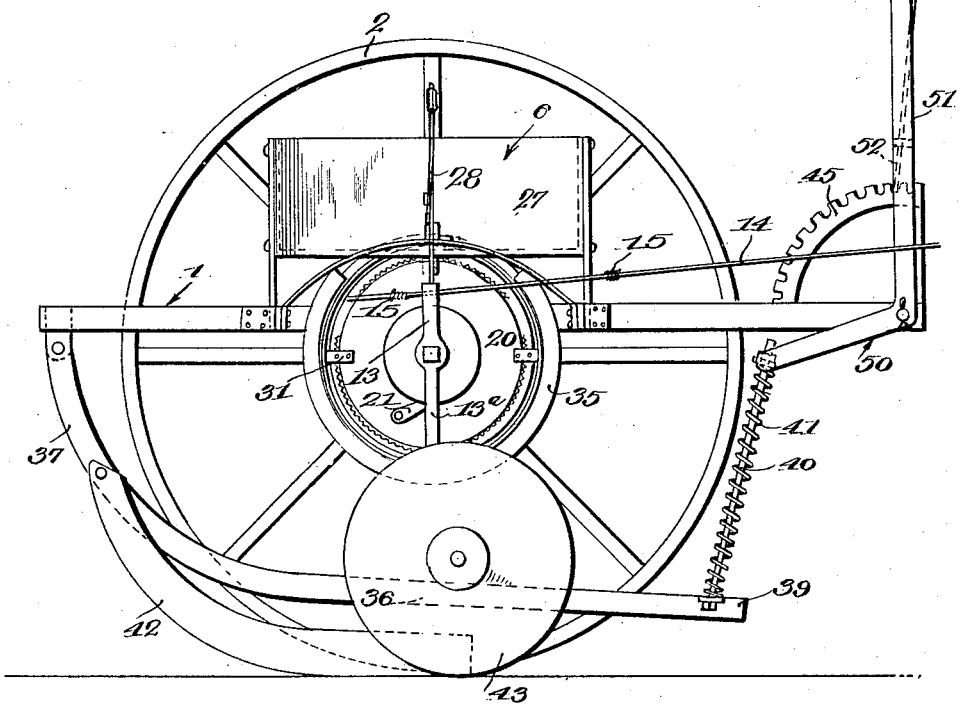

Sept. 20, 1932.   E. MUELLER   1,878,883
CORN PLANTER
Filed March 26, 1931   5 Sheets-Sheet 3
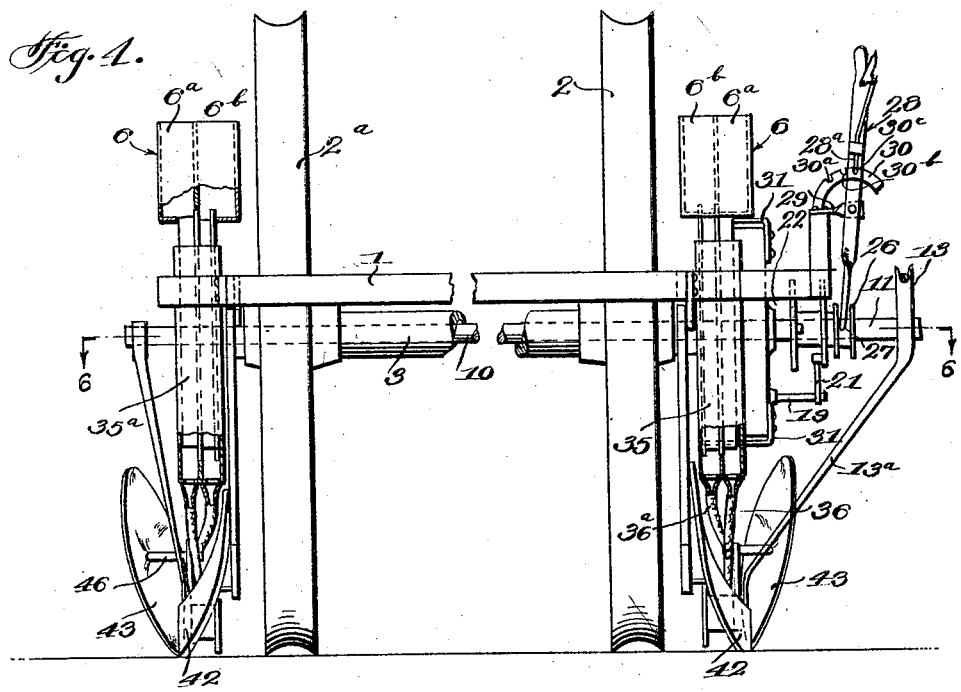
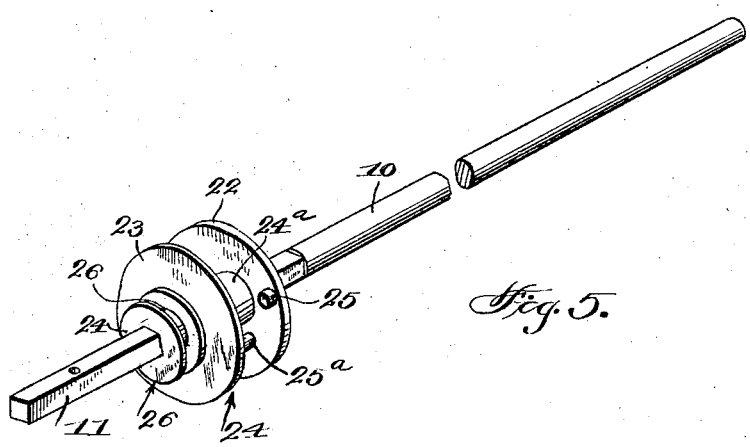

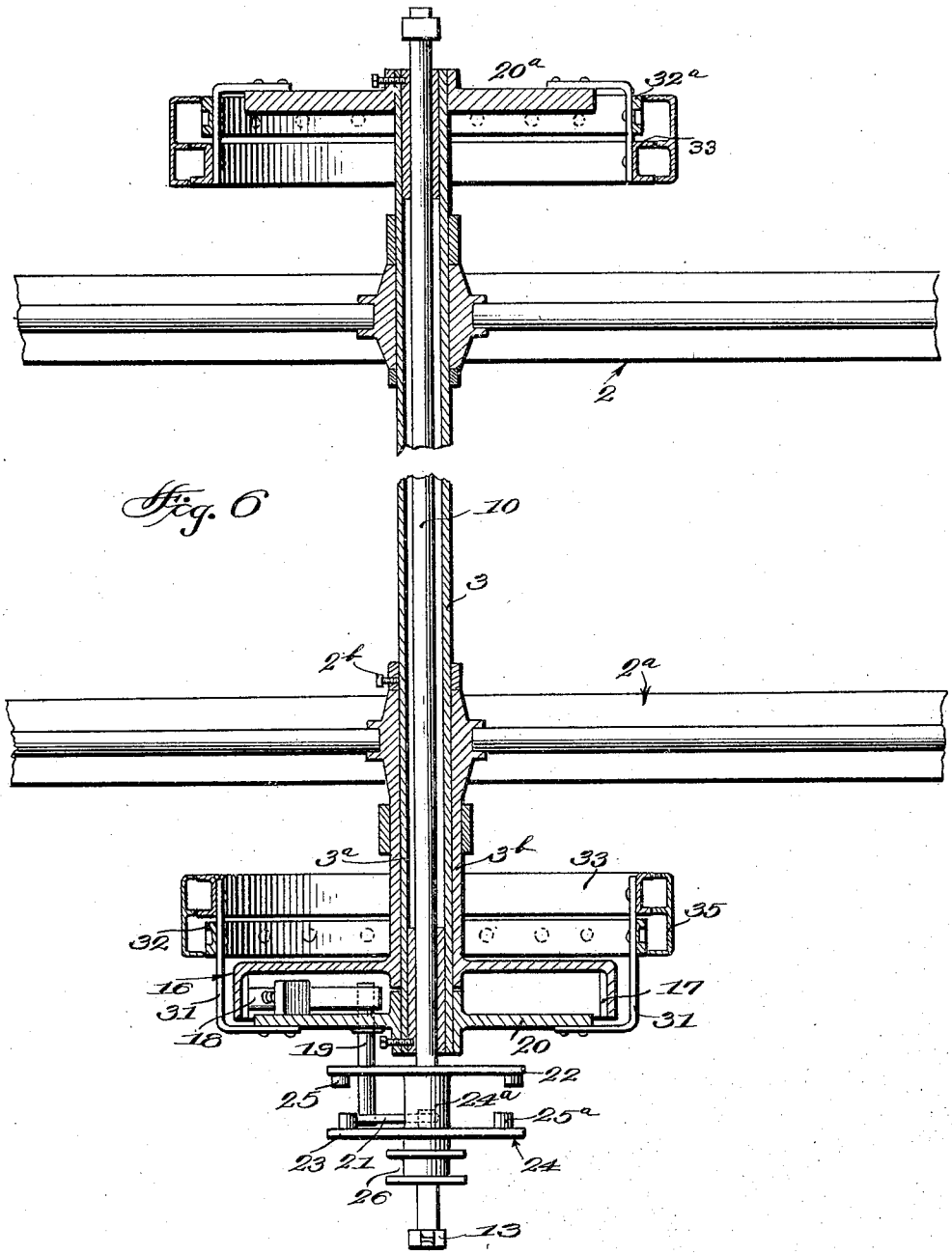

Sept. 20, 1932.  E. MUELLER  1,878,883
CORN PLANTER
Filed March 26, 1931  5 Sheets-Sheet 5
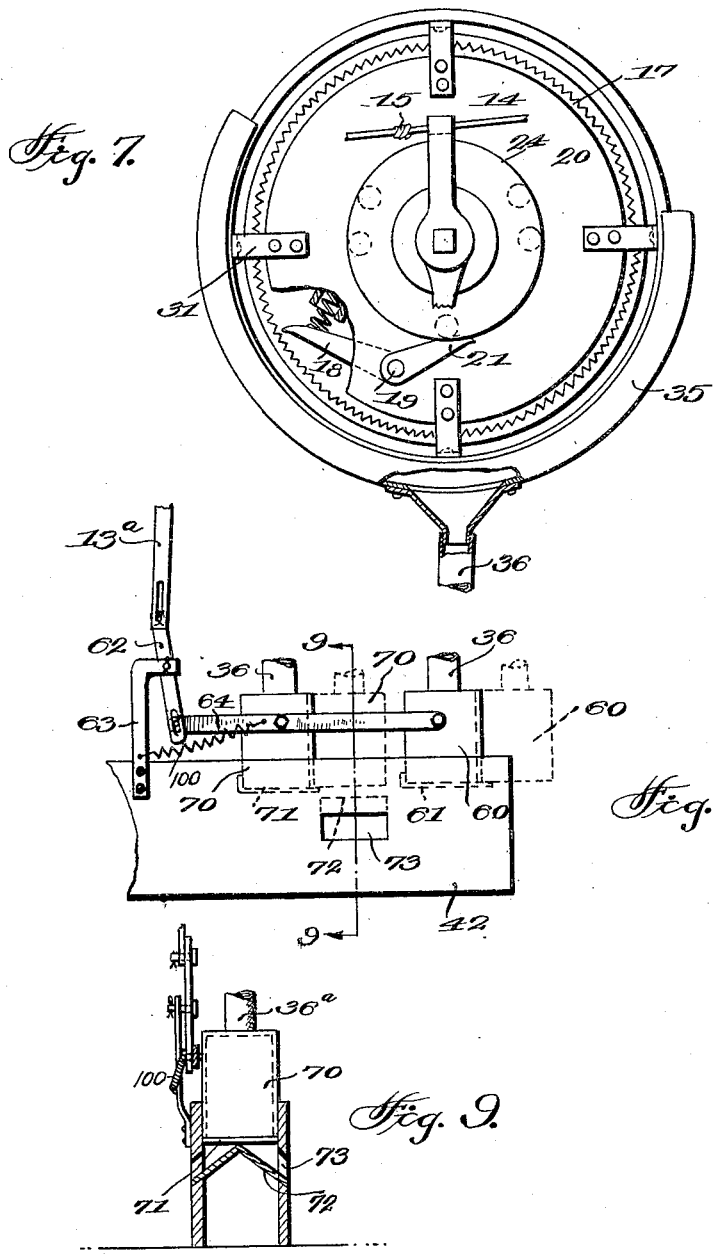
WITNESS
J Markey
INVENTOR
Edward Mueller
BY
ATTORNEY Patented Sept. 20, 1932

1,878,883

UNITED STATES PATENT OFFICE

EDWARD MUELLER, OF ALMA, WISCONSIN

CORN PLANTER

Application filed March 26, 1931. Serial No. 525,553.

This invention relates to corn planters.

A primary object of the invention is to so construct a machine of this character that a desired and uniform planting depth may be maintained irrespective of irregularity in the surface of the seed bed.

Another object is to avoid the passage of the supporting wheel over the planted rows and to so construct the machine that the weight of the fertilizer attachment, the operator and in fact of the entire machine, is carried by the supporting wheels thereby relieving the furrow opener of weight.

Still another object is to provide a planter which will form a ridge instead of a depression over the seed whereby harrowing will readily break the crust and permit the sprouted seed to emerge and the surrounding earth to become mellow and warm.

Another object is to so construct a machine of this character which is simple and comparatively inexpensive to manufacture and in which all chains and gears are eliminated avoiding breakage and repairs incident thereto.

In carrying out these objects, the invention is susceptible of a wide range of modification without departing from the spirit or sacrificing any of the advantages of the claimed inventon; there being shown in the drawings for illustrative purposes a preferred and practical form, in which:

Fig. 2 is a side elevation thereof;

Fig. 3 is a detail perspective view of the planting mechanism and the associated parts;

Fig. 4 is a front elevation with parts broken out for convenience in illustration;

Fig. 5 is a detail perspective view of the clutch carrying rod with parts broken out.

Fig. 6 is a detail horizontal section taken on the line 6—6 of Fig. 4;

Fig. 7 is an enlarged side elevation of the clutch with parts broken out;

Fig. 8 is a detail side elevation of the dropping valves; and

Fig. 9 is a detail sectional view on line 9—9 of Fig. 8.

Figure 1:
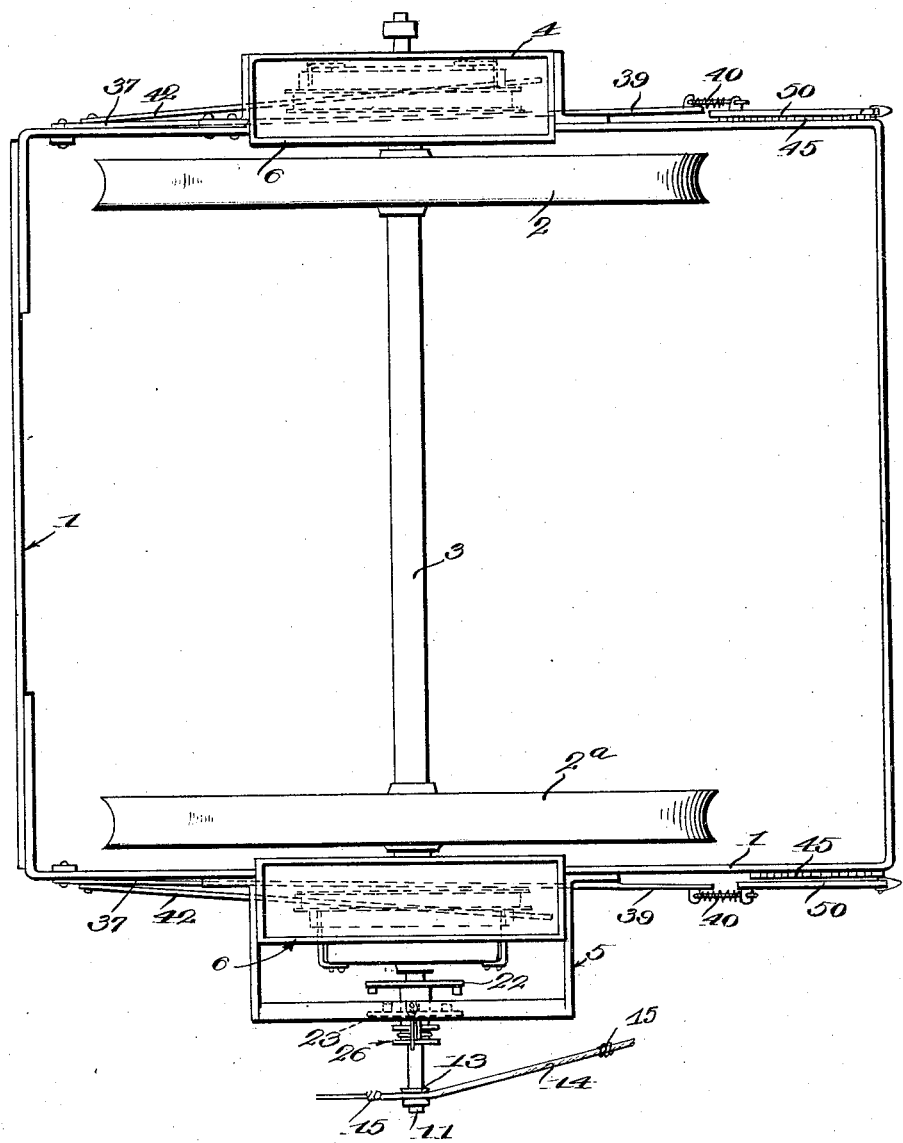
Figure 1 is a top plan view of a corn planter embodying this invention.

In the embodiment illustrated a corn planter frame 1 is shown which may be of any suitable or desired construction, mounted on suitable wheels 2 and 2a connected by a hollow axle 3. Both wheels turn freely on axle 3.

Extending laterally from the side members of the main frame 1 are two auxiliary frames 4 and 5 designed to support the seed and fertilizer hoppers 6 and the parts cooperating therewith.

Extending through the hollow axle 3 is a trip rod or shaft 10 which projects beyond the ends of the hollow axle and has one of such projecting ends made square as shown at 11 in Fig. 5. This squared portion is designed to receive and hold against turning certain parts presently to be described. A trip arm 13 is fixed to end 11 of rod 10 and is bifurcated to receive a knotted actuating wire or cable 14 which when a knot 15 thereof engages said arm will operate to exert a pull on said arm and slightly turn the shaft 10 for a purpose presently to be more fully described. This cable or wire 14 is similar to those ordinarily used in check row corn planters and is operated in the same manner being wound on a drum, not shown, to cause its longitudinal movement relatively to the trip for operating it.

Fixed to a sleeve 3b which extends outwardly from the hub of the wheel 2a and mounted on a hollow axle extension 3a, is a clutch member 16 here shown made integral with sleeve 3b. This clutch member 16 normally turns with sleeve 3b on the revolution of the wheel 2a and is provided with an annular laterally extending internally toothed flange 17 with which is engaged a spring pressed dog or pawl 18 mounted on a shaft 19 which extends through the clutch member 20. This clutch member 20 is fixed on the shaft extension 3a so that when said member 20 turns the hollow axle 3 is also turned and carries with it the seed and fertilizer rings 32a and 33a fixed to the other end of shaft 3 as well as the rings 32 and 33 carried by member 20.

The seed ring 32 and fertilizer ring 33 are carried by the clutch member 20 by means of brackets 31 any desired number of which may be employed, four being here shown. This construction provides for the turning of said rings with said member.

A guard 35 extends around the lower and side portions of the fertilizer and seed rings or hoops as is shown clearly in Figs. 6 and 7 and from the bottom thereof leads a discharge tube 36 for carrying the seed and discharging it into the delivery member 60 which deposits the seed adjacent the furrow opener 37. A similar discharge tube 36a conducts the fertilizer from the ring 33 and deposits it in advance of the seed discharged by the tube 36. A distributing valve 70 for the fertilizer discharges in advance of the seed onto a deflecting member 72 shown clearly in Fig. 9, whereby the fertilizer is placed around the seed and not in direct contact with it.

The furrow opener 37 is pivotally connected at its upwardly curved end to a depending lug 38 carried by the frame 1 of the machine as is shown clearly in Fig. 3. This furrow opener or shoe 37 as shown is made similar to a sleigh runner and the free rear end 39 is connected by a rod 40 with a bell crank lever 50 fulcrumed on the frame 1. This rod is slideably mounted in a lug 40a carried by lever 50 and has a nut 40b on its end above said lug. A coiled spring 41 encircles the rod 40 and bears at its opposite ends against the lever 50 and the opener 39 to form a yieldable connection between the furrow opener and the lever. The upstanding arm 51 of the lever 50 has a spring pressed dog 52 designed to engage the teeth of a segmental rack 45 for locking the lever in adjusted position such as is ordinary with devices of this kind. This lever 50 is located in proper relation for the operator so that he may adjust the furrow opener to the desired depth. It is to be understood that two furrow openers located at opposite sides of the machine are operated individually by a separate lever so that when plowing on a hillside the operator may be able to plant all rows at an even depth. The furrow opener being located parallel with and close to one of the planter supporting wheels provides for the planting of the seed at a uniform depth since the opener being so positioned does not come out of the ground when passing through a depression nor go down too deeply when going over a knoll.

A dog 21 is carried by the outer end of shaft 19 and as shown clearly in Figs. 4, 6 and 7 extends in a direction opposite the dog 18 and lies in the path of a clutch actuating member 24. This member 24 is made in the form of a pair of spaced disks 22 and 23 fixedly mounted on a hub 24a which is held against turning but mounted to slide on the polygonal end 11 of the inner shaft or rod 10 as is shown clearly in Figs. 5 and 6. These disks 22 and 23 are provided respectively on their opposed faces with laterally extending sets of rollers 25 and 25a one or the other of which sets are designed to be positioned at the will of the operator in the path of the dog 21 for a purpose presently to be described. The inner disk 22 has two rollers provided at diametrically opposite points while the outer disk 23 has three equally spaced rollers, those on disk 23 being numbered 25a while those on disk 22 are numbered 25.

The hub 24a which carries the disks 22 and 23 projects at its outer end beyond disk 23 and has fixed thereto a grooved member to receive a fork or yoke 27 of a clutch shifting lever 28 mounted to operate transversely of the machine but longitudinally in relation to the shaft 10.

This lever 28 is fulcrumed intermediate its ends on a suitable support, bracket 29 being here shown. This lever 28 has the usual dog 28a designed to interlockingly engage one of three notches 30a, 30b or 30c formed in an arcuate rack 30 whereby the position of the clutch actuating member 24 may be controlled at the will of the operator, and the roller carried disks 22 and 23 shifted relatively to the dog 21 so that the clutch will be thrown in either twice or three times on each revolution of the wheel 2a according to the roller positioned in the path of dog 21. As shown in Fig. 4 the three notches 30a, 30b, and 30c designed to receive the locking dog 28a holds the lever in adjusted position so that the dog 21 may be engaged either with the two roller disk or three roller disk or placed in neutral between them and not engaged with either.

The longitudinal movement of the wire 14 which takes place during the operation of the planter will cause the knots 15 to successively engage the trip arm 13 exerting a pull thereon sufficient to rock the shaft 10 a sufficient distance to turn the disk or the disk carried member 24 so that the roller thereon engaged by the dog 21 will pass away from said dog. When this occurs the spring pressed pawl or dog 18 will snap into engagement with the teeth on the flange 17 of clutch member 16 and thus turn the seed and fertilizer rings to cause them to deposit the seed and fertilizer into their respective distributing valves.

It is to be understood that when the clutch member 16 revolves it will through the dog 18, and shaft 19, move dog 21 which will when it engages one of the rollers on the disk positioned in its path operate to throw the dog 18 out of engagement with the clutch member 16 and thus stop the movement of the seed and fertilizer rings until the next knot 15 in the cable 14 engages the trip shaft 13, when the operation will be repeated. It is understood that the spacing of the knots 15 on the cable 14 regulates the distance between the hills.

The above described operation takes place during check row planting of the corn.

When it is desired to drill the corn the clutch controlling member 24 is shifted by means of the lever 28 to so position it that the dog 21 will not contact the rollers on either disk 22 or 23 and it will be held in this neutral position by engagement of the dog 28a with the central notch 30b in the rack 30 as shown clearly in Fig. 4. When the parts are in this position the seed and fertilizer rings will rotate continuously and thus deposit the seed in drills with the fertilizer arranged along side it. The seed and fertilizer dropping elements 60 and 70 carried by the lower end of the tubes 36 and 36a normally rest on plates 61 and 71 carried by the furrow opener arm 42 so that the seed and fertilizer to be distributed is held on these plates until the box-like droppers 60 and 70 are shifted beyond the plates and permit the contents to drop onto the ground. This is accomplished by means of an arm 13ª which forms an extension of the trip lever 13 and is connected by a lever 62 fulcrumed intermediate its ends on a bracket 63 carried by the furrow opener arm 42 as is shown clearly in Fig. 8. This lever 62 is connected at its other end by a link or bar 64 with the dropping elements or boxes 60 and 70 so that when said bar is shifted these elements will be simultaneously moved. The lever 62 has a pin and slot connection with the bar 64 and also with the lever arm 13a to provide for the raising and lowering of the furrow opener without breakage of the parts carried thereby.

It will thus be seen that the dropping elements 60 and 70 are reciprocated when one of the knots 15 on the cable 14 moves the trip arm 13.

Seed covering devices 43 are shown in connection with the furrow opener arms 42, one being arranged at each side of the machine and these covering devices are in the form of concave disks carried by brackets 44 attached to the runner-shaped members or arms 42 pivoted to the furrow opener 37 at one end and attached by a rod 13ª to the trip arm 13 as shown clearly in Fig. 3. This concave seed cover 43 being placed at an angle will form a ridge for the seed instead of a depression which is especially desirable when dragging or harrowing a field. Formation of a ridge by the disk 43 adapts the rows to be readily harrowed and the crust broken so that the spouts may come through and the soil of the rows become mellow and warmer. If a depression is formed over the seed bed the harrow does not reach the bottom of the depression and so cannot do a perfect job which is very necessary after heavy rain, shortly after planting, especially on heavy soil.

The fertilizer and seed hoppers 6 are fastened to the frame of the planter just above the fertilizer and corn planter plates and are secured in such a manner that these plates run inside the respective hoppers or compartments, the seed compartments being numbered 6a and the fertilizer compartments 6b.

Arranged below the fertilizer distributing valve 70 is a divider or deflector 72 which extends through openings 73 in the side walls of the member 42 so that fertilizer is deposited on both sides of a seed hill without contacting the kernel.

It will thus be seen that the seed dropper valve 60 is normally closed at the bottom by plate 61 and the fertilizer dropping valve 70 is closed by the plate 71 and when in this position they are ready for receiving the kernels and fertilizer dropped through the respective tubes 36 and 36a. Then when a knot 15 on cable 14 contacts the trip arm 13 it will exert a pull on this arm and through the rod or extension 13a of the lever 13 will exert a slight pull which is transmitted through the lever 62 and bar 64 and pushes back the valves 60 and 70 into the dotted line position shown in Fig. 8. When in this position these valves move away from the plates 61 and 71 and permit the kernels and fertilizer to drop into the furrow prepared for them. The fertilizer valve being located directly in advance of the seed valve operates simultaneously therewith and as explained above the fertilizer is deflected by the divider 72 so that the fertilizer will be deposited on opposite sides of a hill without contacting the seed. The cover 43 then operates in the manner above described to cover the seed and fertilizer and form the desired ridge.

When it is desired to transport the planter from field to field or to move it without operating the planter mechanism the lever 51 is operated to raise the bar 39 and the parts connected therewith so that they will not contact the ground and it is locked in adjusted position by the dog 52 engaged with the rack teeth 45. The lever 28 is also placed in neutral position and the cable 14 is disconnected from the lever 13.

The lever 13 is returned to its normal or starting position by a spring 100 having one end secured to the bracket 63 while the other end of said spring is connected to the link 64. Thus it will be seen that the spring will tend at all times to move the members 60 and 70 to their normal inoperative position and likewise return the lever 13ª to its normal position.

I claim:

1. In a seed planter, a frame, seed dropping mechanism, wheels supporting said frame, a hollow axle on which said wheels are free to turn, a shaft extending through said axle and rotatable therein, said axle having an extension beyond one of said wheels, the wheel adjacent said axle extension having a sleeve extension on its hub, a clutch mechanism fixed to said hub extension to turn with said wheel, a cooperating clutch member fixed to said hollow axle, a pawl carried by said axle carried clutch member and adapted to engage the hub carried clutch member, means on said shaft to control the engagement and disengagement of the pawl and the consequent actuation of the seed dropping mechanism, and means for automatically operating said pawl controlling means.

2. In a seed planter, a frame, wheels supporting said frame, a hollow axle mounted to rotate in said frame, said wheels being free to turn on said axle, a shaft extending through said axle and rotatable therein, said shaft extending beyond said axle at its end, seed dropping means carried by said axle end, clutch mechanism for controlling the operation of said dropping mechanism, means slidable on said shaft end and turnable with said shaft to control the dropping mechanism, and automatically operated means for controlling said shaft carried means.

3. In a seed planter, a frame, seed dropping mechanism, wheels supporting said frame, a hollow axle on which said wheels are free to turn, a shaft extending through said axle and rotatable therein, said axle having an extension beyond one of said wheels, the wheels adjacent said axle extension having a sleeve, a clutch mechanism fixed to said sleeve to turn with said wheel, a cooperating clutch member fixed to said hollow axle, means carried by said axle carried clutch member and adapted to engage the sleeve carried clutch member, means on said shaft to control the engagement and disengagement of the means on said axle carried clutch member and the consequent actuation of the seed dropping mechanism, and means for operating said last mentioned means.

EDWARD MUELLER.